United States Patent
Song et al.

(10) Patent No.: US 8,977,624 B2
(45) Date of Patent: Mar. 10, 2015

(54) ENHANCING SEARCH-RESULT RELEVANCE RANKING USING UNIFORM RESOURCE LOCATORS FOR QUERIES CONTAINING NON-ENCODING CHARACTERS

(75) Inventors: Ruihua Song, Beijing (CN); Qi Yao, Sammamish, WA (US); Junyan Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 561 days.

(21) Appl. No.: 12/871,576

(22) Filed: Aug. 30, 2010

(65) Prior Publication Data
US 2012/0054192 A1 Mar. 1, 2012

(51) Int. Cl.
*G06F 17/30* (2006.01)

(52) U.S. Cl.
CPC .... *G06F 17/30864* (2013.01); *G06F 17/30887* (2013.01)
USPC .......................................... 707/741; 707/756

(58) Field of Classification Search
CPC ..................... G06F 17/30864; G06F 17/30887
USPC ............ 707/741, 756; 715/201, 264; 709/245
See application file for complete search history.

(56) References Cited

U.S. PATENT DOCUMENTS

| 6,604,101 | B1 | 8/2003 | Chan |
|---|---|---|---|
| 7,058,626 | B1 | 6/2006 | Pan |
| 2004/0177327 | A1 | 9/2004 | Kieffer |
| 2004/0194018 | A1 | 9/2004 | Abir |
| 2004/0243568 | A1 | 12/2004 | Wang |
| 2009/0006389 | A1 | 1/2009 | Piscitello |

FOREIGN PATENT DOCUMENTS

| CN | 1332876 A | 1/2002 |
|---|---|---|
| CN | 1376981 | 10/2002 |
| CN | 1707476 A | 12/2005 |
| WO | WO 00/19342 | 4/2000 |

OTHER PUBLICATIONS

Kraaij, Wessel et al., "The Importance of Prior Probabilities for Entry Page Search," SIGIR '02, Aug. 11-15, 2002, Tampere Finland, 8 pgs.
Craswell, Nick et al., "Relevance Weighting for Query Independent Evidence," SIGIR '05, Aug. 15-19, 2005, Salvador, Brazil, 8pgs.
(Continued)

*Primary Examiner* — Shahid Alam
(74) *Attorney, Agent, or Firm* — Dave Ream; Doug Barker; Micky Minhas (57) ABSTRACT

Computer-readable media, computer systems, and computing devices facilitate enhancing a web index with uniform resource locator (URL)/non-encoding character (NEC) word pairs to facilitate relevance ranking of search results provided in response to a search query that includes NEC words. URLs are received from web pages and substrings extracted therefrom. Additional elements are received from the web page, word-broken into sequences of NEC words, and the NEC words are converted into encoding-language representations which are matched against the URL substrings to identify candidate URL/NEC pairs for utilization in relevance ranking.

20 Claims, 9 Drawing Sheets

(56) References Cited

OTHER PUBLICATIONS

Westerveld, Thijs et al., "Retrieving Web Pages using Content, Links, URLs and Anchors," The Tenth Text Retrieval Conference, p. 663-672, 2001.

Zhang, Wen-Hui et al., "A Multilingual (Chinese, English) Indexing, Retrieval, Searching Search Engine," China Internet Network Information Center, P.R.China, 10 pgs, 1999. website: http://www.isoc.org/inet99/proceedings/posters/210/index.htm.

Shymova, Julia, "Managing URL Aliases," website—eZ Systems—The Content Management Ecosystem, Apr. 22, 2010, 5 pgs.

Tseng, Huihsin, "Mining Search Engine Clickthrough Log for Matching N-gram Features," Proceedings of the 2009 Conference on Empirical Methods in Natural Language Processing, pp. 524-533, Singapore, Aug. 6-7, 2009.

Song, Ruihua, et al., "Exploring URL Hit Priors for Web Search," Advances in Information Retrieval, 28th European Conference on IR Research, ECIR 2006, London, UK, Apr. 10-12, 2006.

Ogilvie, Paul et al., "Combining Structural Information and the Use of Priors in Mixed Named-Page and Homepage Finding," Proceedings of the Twelfth Text Retrieval Conference (TREC-12), p. 177-184, 2003.

Chi, Chi-Hung et al., "Word Segmentation and Recognition for Web Document Framework," CIKM '99, Nov. 1999, Kansas City, MO, USA, 8 pgs.

"Fourth Office Action and Search Report Received in China Patent Application No. 201110252294.3", Mailed Date: Sep. 25, 2014, 6 pages.

"Third Office Action Received in China Patent Application No. 201110252294.3", Mailed Date: Apr. 11, 2014, 13 pages.

| NEC CHAR | FULL PINYIN | ABBREV. PINYIN | ENGLISH |
|---|---|---|---|
| 游戏 | YOUXI | | GAME |
| 网络 | WANGLUO | | ONLINE |
| 网络 游戏 | WANGLUO YOUXI | WLYX | ONLINE GAME |

FIG. 4

HTTP://MSN.YNET.COM/ENT/STARS/ZHANGBOZHI/

ENHANCING SEARCH-RESULT RELEVANCE RANKING USING UNIFORM RESOURCE LOCATORS FOR QUERIES CONTAINING NON-ENCODING CHARACTERS

BACKGROUND

Uniform Resource Locators (URLs) corresponding to web pages have been shown to contain useful information for measuring the relevance of web pages to search queries. There has been a great deal of work performed that addresses the issue of making use of URLs in improving the quality of search-result relevance ranking. This work traditionally has been focused on western-language web pages whose alphabet set could be represented by encoding characters such as, for example, ASCII characters, because URLs are composed of strings of characters from the US-ASCII character set (referred to herein as encoding characters).

For languages that include characters that are not allowed for use in URLs (i.e., "non-encoding characters," (NECs) which can include, for example, Chinese, Japanese, Korean, and other similar languages), matching queries to URLs tends to be difficult since the URLs are represented by encoding characters. To more effectively utilize URLs for relevance ranking in NEC-language markets, it is desirable that a search query and corresponding URLs are represented in the same format. Consistent formats can be achieved in one of two manners. The first is by altering the query at online serving time, in which the NEC query is converted into English words, pinyin representations (i.e., pronunciation of Chinese characters), digital characters, or a combination of these, based on a mapping table built offline according to rules of similar meaning or pronunciations between the NEC words and their corresponding encoding-language form. The other, more robust, approach is to transform meaningful parts of the URL into NEC words and build the transformed URL into the web index during index generation.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide for performing off-line procedures that facilitate enhancing a web index by including pairs of URLs and corresponding NEC words to facilitate search-result relevance ranking of NEC-language searches. In embodiments, a URL of a web page is received. URL substrings are extracted from the URL and compared against disambiguating information to infer appropriate corresponding NEC representations of the URL. In embodiments, elements such as, for example, titles, anchors, hierarchy strings, and the like, are extracted from the web page. Each element is word-broken into a sequence of NEC words. A NEC-to-encoding-language mapping table is referenced to identify all possible encoding-language representations of each NEC word in the element. In embodiments, a lattice representing the word-broken element is generated in which each node corresponds to a possible encoding-language representation of a NEC word.

Using the lattices, algorithms can be employed that traverse the lattices, defining lattice paths that can be compared with the extracted URL substrings to identify matches. Lattice paths that match URL substrings are added to a potential candidate string list, along with confidence scores associated with the corresponding match. The potential candidate strings can be paired with the corresponding URL substrings and incorporated into a web index to facilitate NEC-language search-result relevance ranking processes employed online.

BRIEF DESCRIPTION OF THE DRAWINGS

Embodiments of the inventions are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include computing devices and computer-readable media for causing computing devices to perform a method of enhancing a web index with URL/NEC word pairs to facilitate relevance ranking of search results provided in response to a search query that includes NEC words. In embodiments, the illustrative method includes receiving a uniform resource locator (URL) corresponding to a web page, wherein the URL includes a first string of encoding characters. In embodiments, the illustrative method also includes transforming the first string of encoding characters into one or more NEC words; and including the set of NEC words in a web index.

In a second illustrative embodiment, computer-executable instructions cause a computing device to perform a method of enhancing a web index with URL/NEC word pairs to facilitate relevance ranking of search results provided in response to a search query that includes NEC words. In embodiments, the illustrative method includes creating a mapping table that includes mappings between a NEC language and a character-encoding language. A uniform resource locator (URL) string corresponding to a web page is received. Embodiments of the method also include referencing a plurality of elements from the web page and converting, based on the elements, the URL string into a sequence of NEC words. In embodiments, the illustrative method also includes building a web index that includes the set of NEC words.

In a third illustrative embodiment, a set of computer-executable instructions provides an exemplary method of enhancing a web index with URL/NEC word pairs to facilitate relevance ranking of search results provided in response to a search query that includes NEC words. In embodiments, the method includes receiving a uniform resource locator (URL) that corresponds to the web page and extracting a URL substring from the URL. An element is received from the web page, wherein the element is represented by a NEC language and a mapping table is referenced to identify possible encoding-character representations of the element. In embodiments, the illustrative method further includes determining that one of the plurality of possible encoding-character representations of the element matches the URL substring; and including the selected encoding-character representation and the corresponding NEC words in a web index.

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

Figure 1:
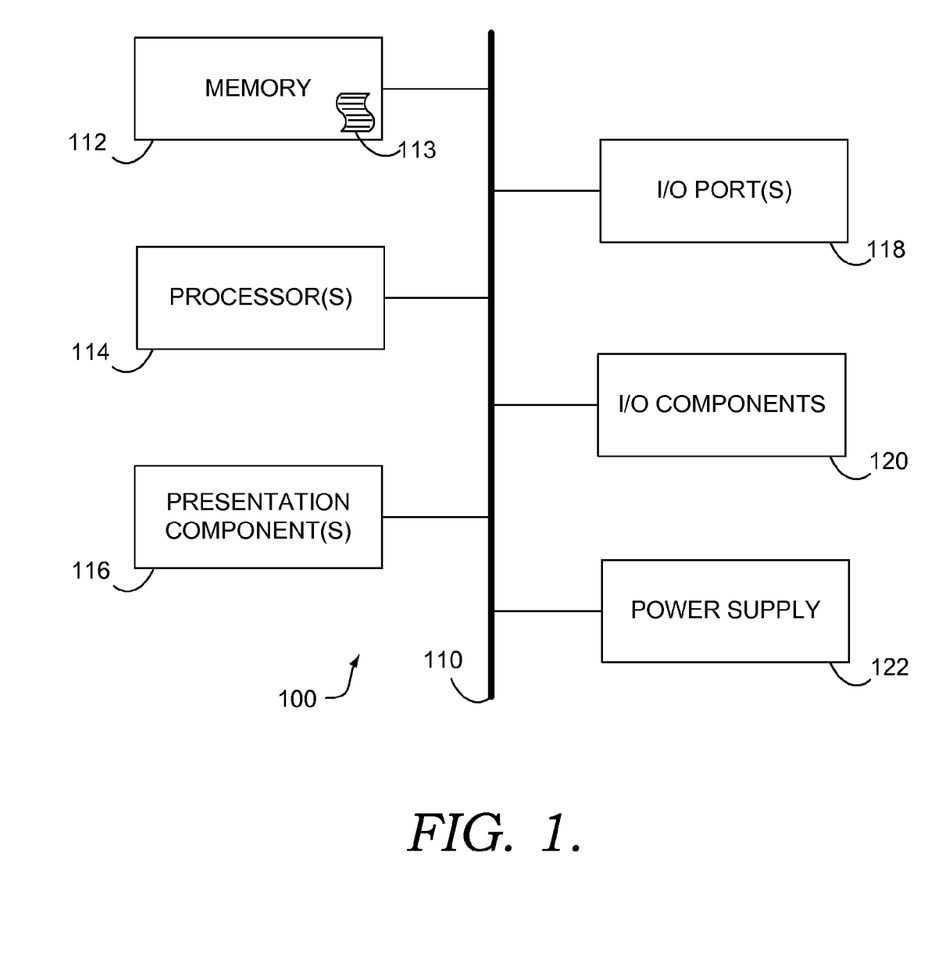
FIG. 1 is a block diagram of an exemplary computing device suitable for implementing embodiments of the invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Memory 112 includes computer-executable instructions 113 stored in volatile and/or nonvolatile memory. The memory may be removable, nonremovable, or a combination thereof. Exemplary hardware devices include solid-state memory, hard drives, optical-disc drives, etc. Computing device 100 includes one or more processors 114 coupled with system bus 110 that read data from various entities such as memory 112 or I/LO components 120. In an embodiment, the one or more processors 114 execute the computer-executable instructions 113 to perform various tasks and methods defined by the computer-executable instructions 115. Presentation component(s) 116 are coupled to system bus 110 and present data indications to a user or other device. Exemplary presentation components 116 include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse. I/O components 120 can also include communication connections 121 that can facilitate communicatively connecting the computing device 100 to remote devices such as, for example, other computing devices, servers, routers, and the like.

Since URLs are generally composed of encoding-language characters (e.g., ASCII characters), when a Chinese webpage designer, for example, creates a new page, he tends to use English words, pinyin, digital strings or combinations of these to represent its Chinese name. For example, if the web page includes online games (note that the corresponding word-broken Chinese for "online games" is "网络 游戏"), the page owner might choose, for example, the following ASCII names for the URL: "online games", "wangluoyouxi" (full pinyin representation), or "wlyx" (abbreviated pinyin). Thus, to facilitate search-result relevance ranking, the search query and web index information should be represented in similar form.

Although altering a query into its ASCII format is one solution to utilize URL information for relevance improvement of NEC (Chinese, Japanese, and Korean languages) pages, it tends to be relatively ineffective and inefficient. Embodiments of the present invention facilitate moving the URL transforming process to an offline environment instead, in which meaningful parts of a URL are transformed into NEC words. In this process, important page content, such as titles and anchors, can be used to decide or disambiguate between the candidate NEC words. These NEC words can be built into a web index as an alternate metastream to replace or supplement the original URL metastream for NEC page ranking.

Figure 2:
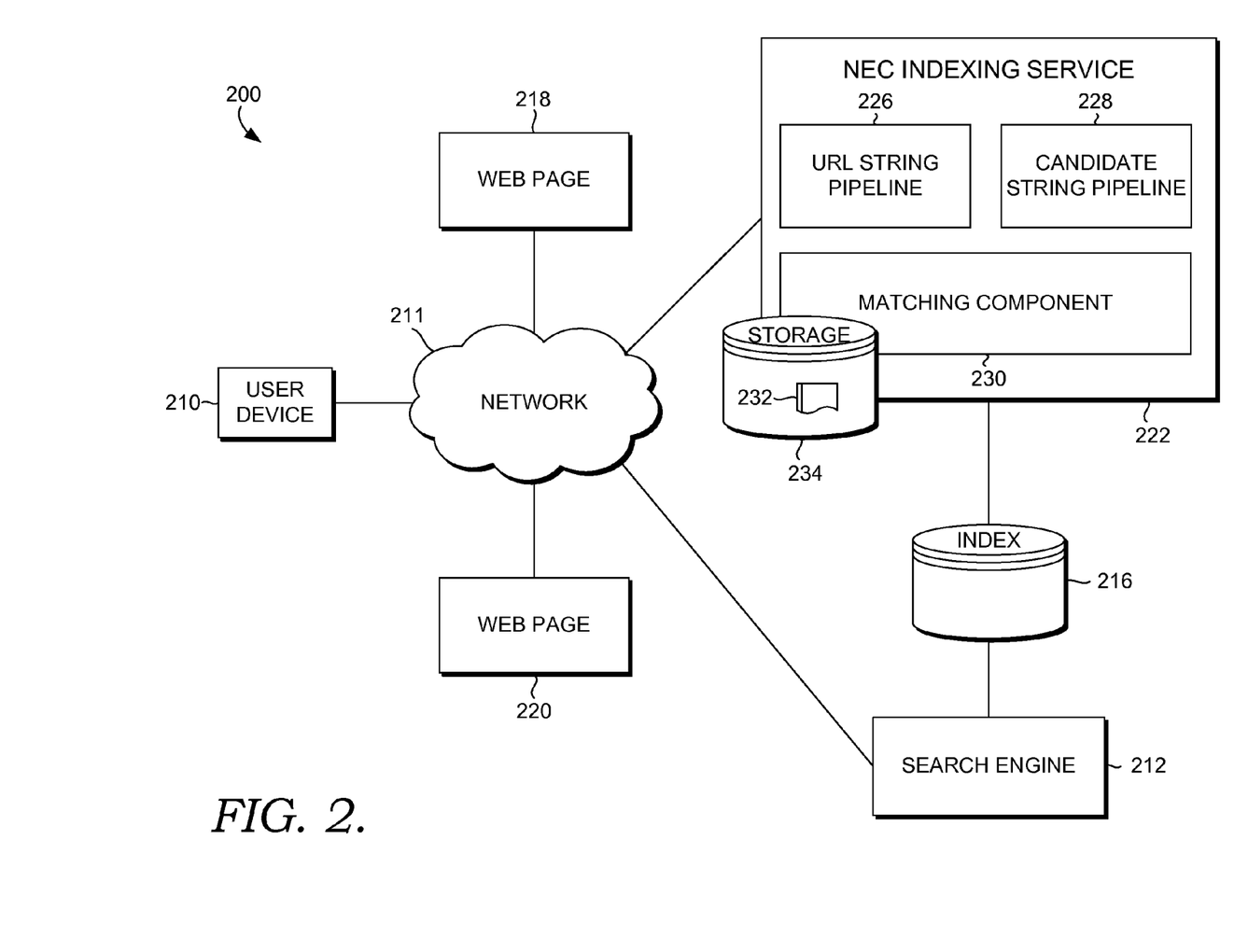
FIG. 2 is a block diagram of an exemplary network environment suitable for use in implementing embodiments of the invention.

Turning now to FIG. 2, a block diagram of an exemplary network environment 200 suitable for use in implementing embodiments of the inventions is shown. Network environment 200 includes user device 210, network 211, search engine 212, web index 216 (which includes searchable, indexed information associated with web pages 218 and 220, which can be provided by web servers), and NEC indexing service 222. User device 210 communicates with search engine 212 through network 211, which may include any number of networks such as, for example, a local area network (LAN), a wide area network (WAN), the Internet, a cellular network, a peer-to-peer (P2P) network, a mobile network, or a combination of networks. The exemplary network environment 200 shown in FIG. 2 is an example of one suitable network environment 200 and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein.

User device 210 can be any kind of computing device capable of allowing a user to submit a search query to search engine 212 and to receive, in response to the search query, a search results page from the search engine 212. For example, in an embodiment, user device 210 can be a computing device such as computing device 100, as described above with reference to FIG. 1. In embodiments, user device 210 can be a personal computer (PC), a laptop computer, a workstation, a mobile computing device, a PDA, a cell phone, or the like.

Search engine 212, as well as index 216 and NEC indexing service 222 can be implemented as server systems, program modules, virtual machines, components of a server or servers, networks, and the like. In one embodiment, for example, each of the components 212, 216, and 222 is implemented as a separate server. In another embodiment, all of the components 212, 216, and 222 are implemented on a single server or a bank of servers.

In an embodiment, user device 210 is separate and distinct from search engine 212 and/or the other components illustrated in FIG. 2. In another embodiment, user device 210 is integrated with search engine 212. For clarity of explanation, we shall describe embodiments in which each of user device 210, and components 212, 216, and 222 are separate, while understanding that this may not be the case in various configurations contemplated within the present invention.

As shown in FIG. 2, user device 210 communicates with search engine 212. Search engine 212 receives search queries, i.e., search requests, submitted by a user via user device 210. Search queries received from a user can include search queries that were manually or verbally inputted by the user, queries that were suggested to the user and selected by the user, and any other search queries received by the search engine 212 that were somehow approved by the user. In embodiments, search queries include one or more NEC words. As the term is used herein, "NEC words" refers to any type of symbol, character, mark, drawing, or the like that is associated with a NEC language (e.g., Chinese, Japanese, Korean, etc.). "NEC words" can include sequences of symbol, character, mark, drawing, or the like, as well. That is to say that, throughout the present disclosure, a "NEC word" can refer to a word, a part of a word, a phrase, an acronymn, or any other portion of a written or spoken NEC language.

In some embodiments, a search query can consist only of NEC words, while in other embodiments, a search query can include a combination of NEC words and some other type of words or characters such as, for example, encoding characters. Search engine 212 may be or include, for example, a search engine, a crawler, or the like. Search engine 212, in some embodiments, is configured to perform a search using a query submitted through user device 210. In various embodiments, search engine 212 can provide a user interface for facilitating a search experience for a user communicating with user device 210. In an embodiment, search engine 212 monitors searching activity, and can produce one or more records or logs representing search activity, previous queries submitted, search results obtained, and the like. These services can be leveraged to improve the searching experience in many different ways. According to various embodiments of the invention, search engine 212 references an associated web index 216 to identify search results that are relevant to a search query received from a user.

As illustrated in FIG. 2, search engine 212 communicates with NEC indexing service 222. In an embodiment of the present invention, indexing service 222 facilitates enhancing web index 216 with URL/NEC word pairs for use in relevance ranking of search results identified in web index 216. In embodiments, NEC indexing service 222 performs such enhancements off-line and provides the resulting URL/NEC word pairs to web index 216.

In an embodiment, search engine 212 is configured to receive a submitted query and to use the query to perform a search. In an embodiment, upon identifying search results that satisfy the search query, search engine 212 returns a set of search results to user device 210 by way of a graphical interface such as a search results page. A set of search results includes representations of content or content sites (e.g., webpages, databases, or the like that contain content) that are deemed to be relevant to the user-defined search query. Search results can be presented, for example, as content links, snippets, thumbnails, summaries, and the like. Content links refer to selectable representations of content or content sites that correspond to an address for the associated content. For example, a content link can be a selectable representation corresponding to a uniform resource locator (URL), IP address, or other type of address. That way, selection of a content link can result in redirection of the user's browser to the corresponding address, whereby the user can access the associated content. One commonly used example of a content link is a hyperlink (referred to herein, interchangeably, as an anchor).

As shown in FIG. 2, search engine 212 references index 216. It should be understood by those of ordinary skill in the art that index 216 is scalable, and that there may actually be a number of index modules associated with search engine 212. Index 216 can reside on the same machine as search engine 212. In another embodiment, index 216 is remote from search engine 212, and in either case, search engine 212 communicates with index 216 to perform searches and retrieve content, index items, and the like, which are stored on index 216 or some other, storage module, not illustrated in FIG. 2.

With continued reference to FIG. 2, NEC indexing service 222 includes a URL string pipeline 226, a candidate string pipeline 228, and a matching component 230. URL string pipeline 226 includes software, components, modules, or the like for processing URLs received from web pages 218 and 220. In embodiments, URL string pipeline extracts substrings from URLs for use in matching against candidate strings extracted from elements of the corresponding web page. In some embodiments, for example, URL string pipeline receives a URL from a web page 218 or 220, splits the URL according to special characters (e.g., "/", ".", "&", etc.), and extracts substrings (e.g., sub-domain, base domain, path, etc.) from the separated URL. The URL substrings can then be provided to matching component 230 for matching against candidate strings (or, interchangeably, candidate paths).

Candidate string pipeline 228 receives elements from web pages 218 and 220, extracts NEC words from the elements and generates, from the NEC words, candidate strings for matching with extracted URL substrings. In embodiments, elements can include any type of object, text, HTML element, or the like such as, for example, web page titles, anchors, hierarchy strings, and text from a web page body. For example, in an embodiment, candidate string pipeline 228 extracts, from a web page 218 or 220, the web page's title, and the hierarchy string of the web page 218 or 220.

In some embodiments, as shown in FIG. 2, a web page 220 can include an anchor 221 that targets another web page 218. As the term is used herein, "an anchor" refers to a set of hypertext that targets a web page. In embodiments, anchor 221 can be extracted from web page 220 and associated with web page 218. Each time an anchor having the same hypertext as anchor 221 is received, a frequency indication corresponding to the particular hypertext of anchor 221 can be updated to reflect the frequency of the anchor, which refers to the number of times an anchor with a particular set of hypertext that targets a particular web page is encountered during parsing of other web pages.

Candidate string pipeline 228 breaks the extracted elements into sequences of NEC words. For each NEC word, candidate string pipeline looks up the NEC-to-encoding character mapping in a mapping table 232, which can be maintained, for example, in storage 234 associated with NEC indexing service 222, to find all its possible encoding representations.

Figure 4:
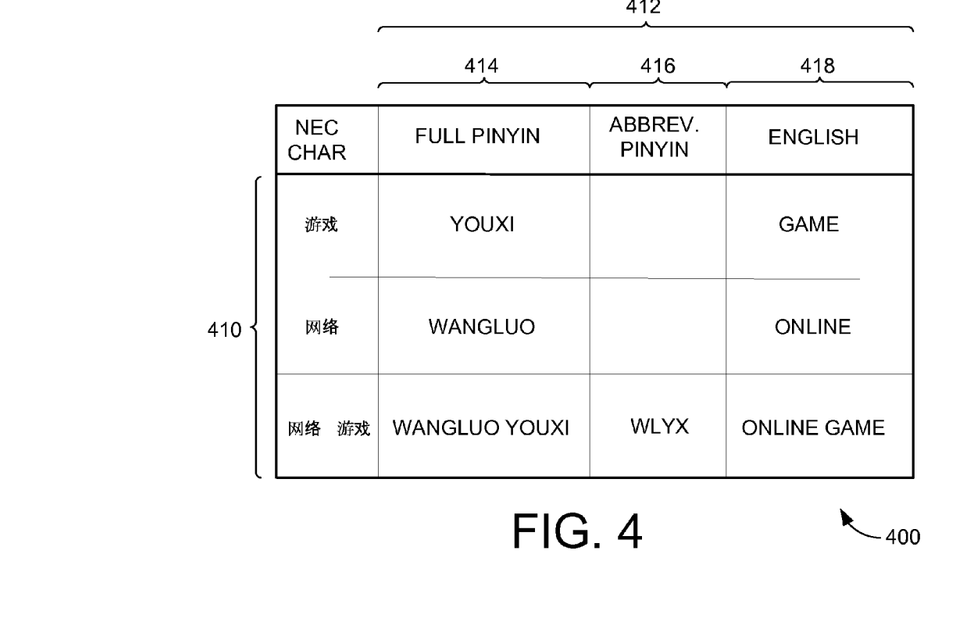
FIG. 4 depicts an illustrative mapping table in accordance with embodiments of the invention.

Turning briefly to FIG. 4, an illustrative mapping table 400 is depicted. The illustrative mapping table 400 shown in FIG. 4 is an example of one suitable mapping table 400 and is not intended to suggest any limitation as to the scope of use or functionality of embodiments of the inventions disclosed throughout this document. Neither should the illustrative mapping table 400 be interpreted as having any dependency or requirement related to any single component or combination of components illustrated therein.

As shown in FIG. 4, illustrative mapping table 400 includes mappings between a NEC language 410 and encoding-language characters 412 such as, for example, ASCII characters, UTF-8 characters, or the like. In the illustrated embodiment, mapping table 400 includes mappings between Chinese words 410 and full pinyin representations 414 of the Chinese words, mappings between Chinese words 410 and abbreviated pinyin representations 416 of the Chinese words, and mappings between Chinese words 410 and the corresponding English translations 418. In embodiments, for example, mapping table 400 can be generated from three resources: a Chinese-to-English lexicon (which contains 446,908 translation pairs); a Chinse-to-Piniyin mapping table (which includes 60,878 Chinese words and their corresponding pronunciation in Pinyin); and a set of various irregular, but popular, Chinese-to-ASCII mapping pairs such as "sina <->新浪" and "elong<->艺龙". Any number of other sources, NEC languages, mappings, and the like can be included in various embodiments of mapping table 400.

Returning to FIG. 2, and according to embodiments of the invention, candidate string pipeline 228 generates a lattice corresponding to each processed element. In embodiments, each node of a lattice is the encoding representation (e.g., pinyin or English words) corresponding to a NEC word and each path through the lattice is a candidate encoding string of the element. Because the body of a web page 218 or 220 typically contains a large number of words, most of which are unrelated to the URL string, the body is not used, in some embodiments, in the matching processes described herein. However, in some embodiments, the body of the web page 218 or 220 can be used for providing extra information from which probable NEC translations of URL substrings can be inferred.

According to embodiments of the invention, NEC indexing service 222 utilizes URL string pipeline 226, candidate string pipeline 228, and matching component 230 to identify pairs of URL substrings and matching NEC words. It should be appreciated by those having skill in the relevant arts that, because of the nature of NEC languages and the nature of translation between NEC languages and Western languages such as encoding characters (e.g., pinyin, English, etc.), a particular URL substring might match a number of different NEC words. In embodiments, NEC indexing service 222 also calculates confidence scores associated with the matched pairs, which can be provided, along with the pairs, to web index 216 for use in search result relevance ranking procedures, as are known in the art.

Figure 3:
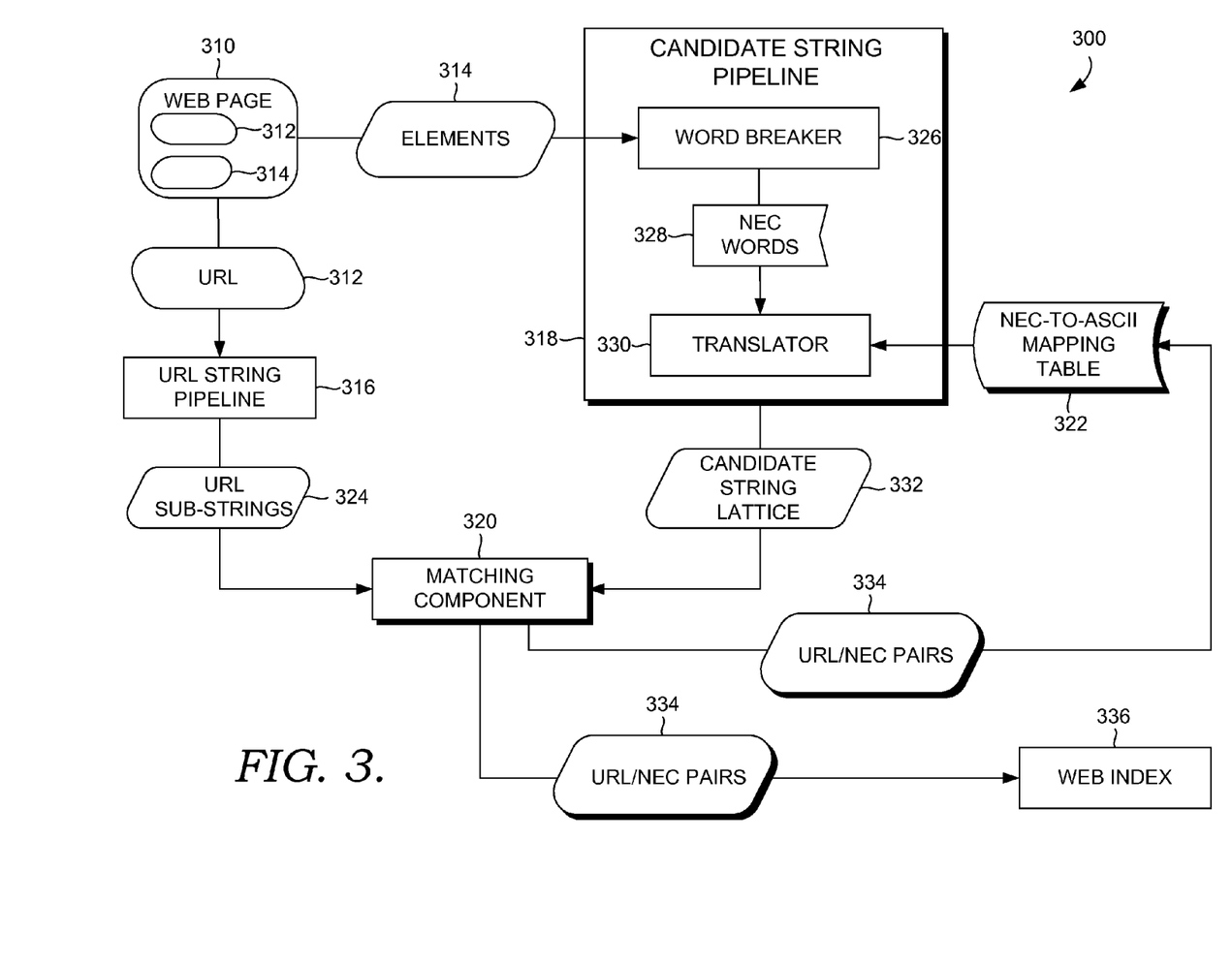
FIG. 3 depicts an illustrative implementation of processing components used for enhancing web indexes with NEC-language/encoding-language pairs in accordance with embodiments of the invention.

Turning now to FIG. 3, an exemplary implementation 300 of embodiments of the invention is depicted. Exemplary implementation 300 includes a web page 310 having a corresponding URL 312 and a set of elements 314. As illustrated in FIG. 3, URL string pipeline 316 receives URL 312 from web page 310. Candidate string pipeline 318 receives elements 314 from web page 310 and converts the elements into sequences of NEC words for use by matching component 320.

Figure 5:
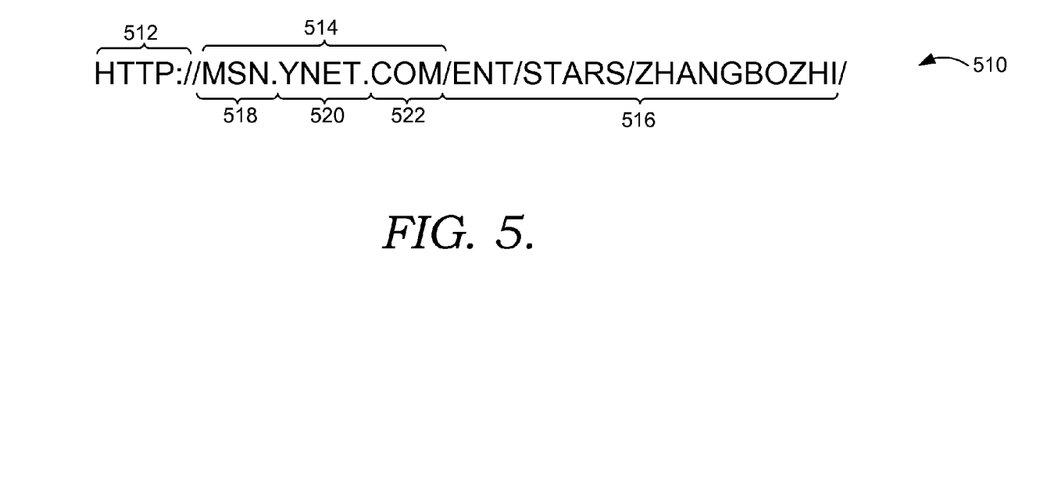
FIG. 5 depicts an illustrative URL, showing various substrings thereof, in accordance with embodiments of the invention.

Upon receiving URL 312, URL string pipeline extracts URL substrings 324 from URL 312. In embodiments, each substring that makes up URL 312 can be extracted, while in other embodiments, only particular types of substrings are extracted. Turning briefly to FIG. 5, an exemplary URL 500 is depicted. As illustrated in FIG. 5, URL 500 has three major parts: a scheme 512, a domain 514, and a path 516. The scheme represents the protocol that the HTML file associated with URL 500 uses. The domain includes three different substrings: sub-domain 518, base domain 520, and top level domain 522. Base domain 520 typically is the registered name of the website that hosts web page 310, while subdomain 518 typically represents the channel of the website. Top level domain 522 typically contains type and location information of the website. The path 516 encodes the directory and file name of web page 310 on the host website (not illustrated for clarity). Based on the above URL structure analysis, meaningful information should generally be found in the sub-domain 518, base domain 520, and path 516. Base domain 520 and sub-domain 518 names often are the target of navigational queries, while path 516 can provide useful information about the web page 310 content and categories.

Returning to FIG. 3, as the official name of a site often occurs in the site's page title, body content, and anchor text pointing to the site's homepage, etc., these types of elements can be leveraged to infer the Chinese name mappings to the base domain and subdomain parts of a URL 312 extracted from web page 310. Additionally, the final part after the last slash (or the file name part) in the path part of a URL usually has close correlation with the page title and visual title. Also, the path parts in front of the last slash sometimes can map to a hierarchy string in the page.

With continued reference to FIG. 3, in URL string pipeline 316, URL 312 string is split by special characters such as, for example, "/", ".", "&", and the like. In embodiments, URL substrings 324 are extracted by URL string pipeline 316. Extracted substrings 324 can include, for example, subdomain, base domain, path, and the like. These URL substrings 324 are candidate strings to be matched with the candidate encoding strings transformed from elements 314 (e.g., page title, anchor, hierarchy string, etc.).

As illustrated in FIG. 3, candidate string pipeline 318 includes a word breaker 326 that breaks elements 314 into sequences of NEC words 328. Each NEC word 328 is provided to a translator 330, which references a mapping table 322 to determine all possible encoding-language representations of each NEC word 328. In embodiments, mapping table 322 can include mappings between a NEC language and encoding characters. For example, in an embodiment, mapping table 322 includes mappings between Chinese words and English representations and mappings between Chinese words and pinyin representations of those words. Upon obtaining the possible encoding-language representations of the NEC words 328, candidate string pipeline 318 generates a lattice corresponding to each processed element. In embodiments, each node of a lattice is the encoding representation (e.g., pinyin or English words) corresponding to a NEC word and each path through the lattice is a candidate encoding string of the element.

The candidate string lattices 332 are provided to matching component 320. Matching component 320 receives each extracted URL substring 324 and matches these against each candidate encoding string transformed from elements 314. According to some embodiments, before matching, heuristic rules are used to prune the lattice to make the matching processes efficient. For example, in some embodiments, the matching processes start from a lattice node which has the same initial encoding characters as the URL sub string with which it is to be matched. Additionally, in embodiments, because observation shows that matches with less than three characters of English words tend to be unreliable, for English word nodes in the lattice, if the substring made of the first three alphabet characters of the English word does not appear in any of the URL substrings, the node can be pruned from the lattice. Further, in some embodiments, an assumption can be made that the URL is generally composed of abbreviations of the title, anchor, and/or hierarchy string, and thus should be shorter in length than these elements. Accordingly, in embodiments, matching component 320 can stop matching processes when the number of pinyin or English terms contained in the candidate encoding string in the lattice exceeds the length of the URL substring to be matched.

According to embodiments, the candidate matching pairs searching algorithm performed by matching component 320 can be described as follows:

---

```
FOR each URL substring
  FOR each lattice generated from title, anchor, hierarchy string
    Prune lattice
    WHILE(There is a lattice word node having the same initial alphabet
    or digital character as the URL substring)
    {
      Set LatticeNode to the node having the same initial alphabet or
      digital character as the URL substring.
      IF(MatchURLWithLatticePath(LatticeNode,URLSubString,
      CandidatePairs))
        Add the CandidatePairs into final candidate pair list
      IF reaching the end of the lattice
        break;
    }
Sort candidate paths and output paths
```

---

In the above algorithm, the function named "MatchURL-SubStringWithLattice" matches the input URL substring with each possible lattice path and outputs the matched lattice paths together with their respective confidence scores. In embodiments, this function can be described as follows:

---

```
Initialize CandidatePathLength=1, JumpedNodeList=NULL
WHILE(Not reaching the end of the lattice)
{
  Start from the lattice node that has the same initial alphabet/digital
  character as the URL substring, generate a path from the lattice
  with length = CandidatePathLength
  Remove nodes in JumpedNodeList from the path
  IF(MatchTermInitialCharactersWithURL(Path, URLSubString))
    Add current path to candidate path list
  ELSE
    Add the last node in current path to JumpedNodeList
    IF(JumpedNodeList length > Max_Allowed_Jump_Node_Num)
      break;
  CandidatePathLength ++;
}
FOR each candidate path
  Calculate path confidence score
RETURN all candidate paths and their confidence scores
```

---

In this function, paths are generated starting from the lattice node that has the same initial alphabet or digital character as the URL substring. First, the path with one lattice node (i.e., length=1) will be matched against the URL substring, then paths of length=2, length=3, and so on will be matched. The matching function "MatchingTermInitialCharactersWithURL" is designed to match the initial substring of each term against the URL substring. For example, if the candidate path is "zhang bo zhi" which contains three terms "zhang", "bo", "zhi", and the URL substring is "zbozh", then the matching process could be illustrated as in FIG. 8.

Figure 8:
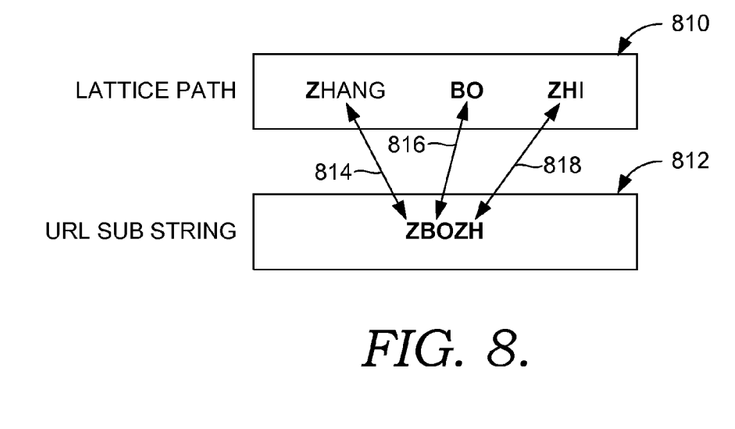
FIG. 8 depicts an illustrative URL-candidate string matching process in accordance with embodiments of the invention.

Turning briefly to FIG. 8, an exemplary lattice path 810 "zhang bo zhi" and an exemplary URL substring 812 "zbozh" are illustrated. Thus, for example, the first character, "z", in the URL substring could match the beginning of "zhang", as shown by arrow 814. Similarly, the string made of the second and third characters in the URL, "bo", could match the beginning of "bo", as shown by arrow 816. Additionally, as shown by arrow 818, the string made of the fourth and fifth characters, "zh", in the URL could match the beginning of "zhi". Accordingly, this would be a valid match and, thus, results in identification of a candidate matching pair.

Then all matched lattice paths will be added to a candidate path list and a confidence score can be calculated for each of them. In embodiments, the confidence score can be based, for example, on path length, matched part length, skipped node number, and the like. In some embodiments, various measures can be employed to make the algorithm more robust. For example, in some embodiments, artificial intelligence, user feedback, statistical evaluation, and the like, can be used to adjust aspects of the NEC indexing processes and algorithms described herein. In one embodiment, the matching process can be configured to skip a certain number of lattice nodes, thereby enabling some partial matches to enter the final candidate path list.

Returning to FIG. 3, matching component 320 provides the resulting URL/NEC word pairs 334 (and, in some embodiments, the corresponding confidence scores) to mapping table 322. In this manner mapping table 322 can be updated each time a matching process is performed, thereby adding to the number of available mappings that can be referenced from mapping table 322. Additionally, in embodiments, the resulting URL/NEC word pairs 334 are included in a web index 336. In some implementations, the resulting URL/NEC word pairs 334 can be added to an existing web index 336. In other implementations, the resulting URL/NEC word pairs 334 can be incorporated in a web index 336 at the time of creation thereof. In further embodiments, the resulting URL/NEC word pairs 334 may be maintained in a data structure (e.g., table, database, etc.) that is separate from, but associated with, web index 336.

Figure 6:
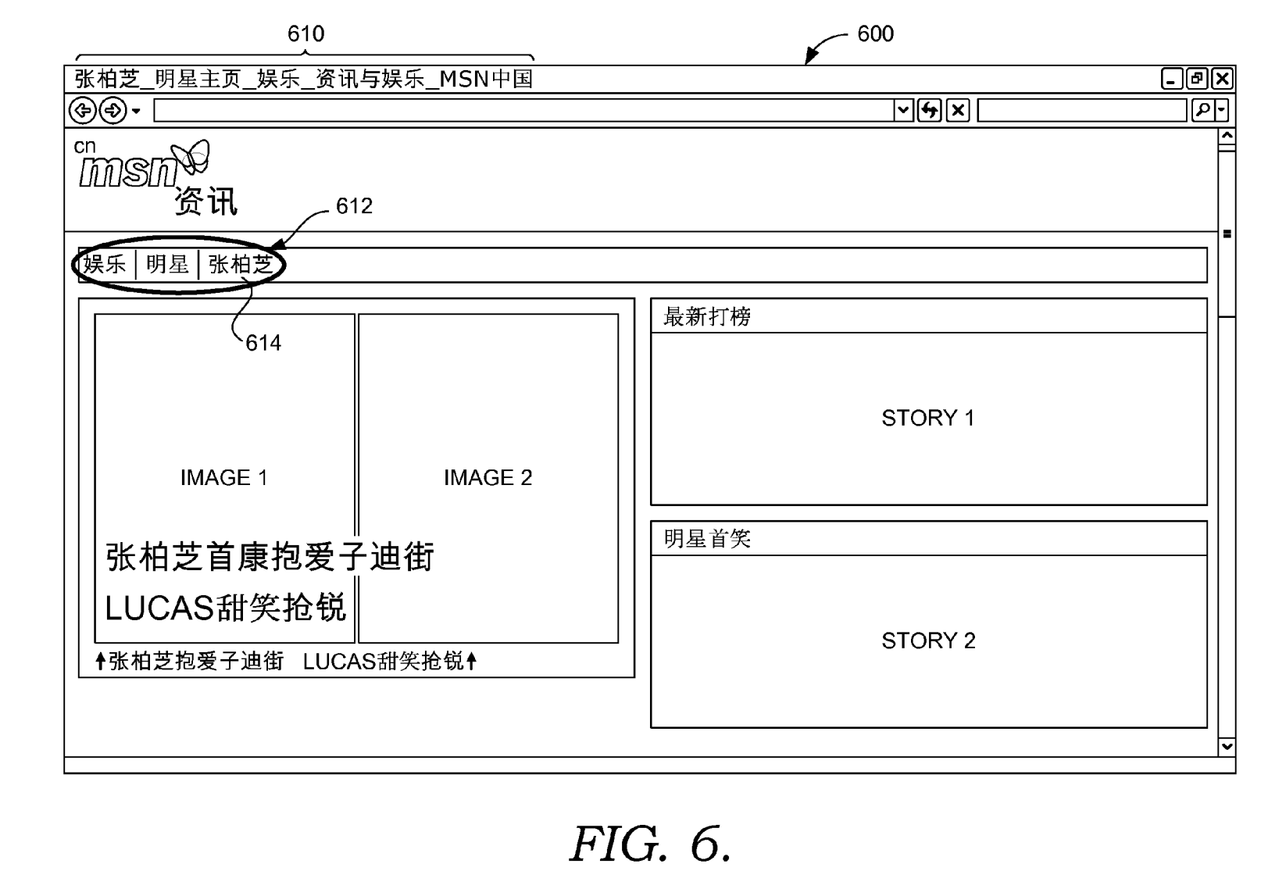
FIG. 6 depicts an illustrative Chinese-language web page in accordance with embodiments of the invention.

To illustrate an embodiment of the invention in operation, reference is made to FIGS. 6-9. An exemplary Chinese web page 600 is illustrated in FIG. 6. Exemplary Chinese web page includes a title 610 and a hierarchy string 612. Additionally, as illustrated in FIG. 2, anchors 221 from other web pages that target web page 600 can be extracted and frequency indications associated with them. In embodiments, the three most-occurring sets of hypertext (e.g., as anchors on other web pages) are selected (and may be referred to herein as the "top three anchors").

For the exemplary web page 600 depicted in FIG. 6, assume the top three anchors, based on frequency of targeting web page 600, are "张柏芝 MSN 首页", "张柏芝", and "女明星张柏芝". As illustrated in FIG. 6, the title of the web page 600 is "张柏芝_明星主页_娱乐_资讯与娱乐_MSN 中国". After work-breaking, the top 3 anchors can be represented as "张柏芝 msn 首页", "张柏芝", and "女 明星 张柏芝". Similarly, the word-broken title is " 张柏芝 明星 主页 娱乐 资讯 与 娱乐 msn 中国".

For the purpose of the present example, it is assumed that the Chinese-to-encoding-language (in this case, ASCII, characterized by pinyin and English representations) mapping table corresponding to these words is similar to Table 1.

TABLE 1

Pinyin and English mapping of the words

| Chinese Word | Pinyin | English |
| --- | --- | --- |
| 张柏芝 | zhang bo zhi | Cecilia |
| 首页 | shou ye | homepage |
| 女 | nv | female |
| 明星 | ming xing | star |
| 主页 | zhu ye | homepage |
| 娱乐 | yu le | entertainment |
| 资讯 | zi xun | news |
| 与 | yu | and |
| 中国 | zhong guo | China |

Figure 7:
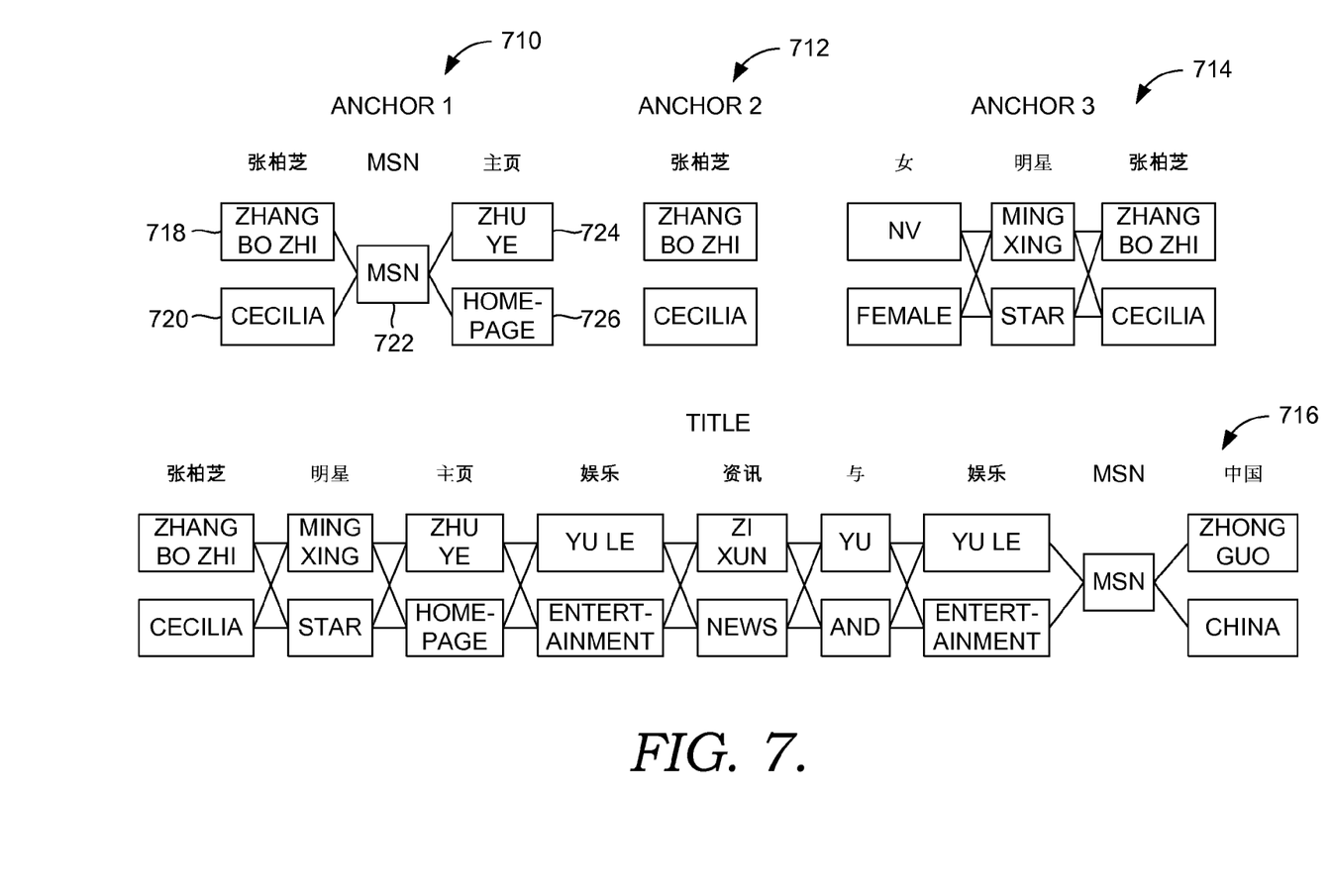
FIG. 7 depicts an illustrative set of lattices representing web page elements in accordance with embodiments of the invention.

Accordingly, in an embodiment, the candidate ASCII string lattice of the top 3 anchor text strings and page title can be as depicted in FIG. 7. Turning briefly to FIG. 7, an exemplary set of candidate ASCII string lattices is illustrated. As shown in FIG. 7, generation of lattices from the word-broken anchors and title result in a lattice 710 corresponding to the first of the top three anchors, a lattice 712 corresponding to the second of the top three anchors, and a lattice 714 corresponding to the third of the top three anchors. Additionally, as illustrated in FIG. 7, the word-broken title can be represented by a lattice 716. As described previously, each lattice includes a set of nodes, each node corresponding to an encoding-language representation of a NEC word. For example, the first anchor lattice 710 includes a node 718 corresponding to the pinyin representation "zhang bo zhi", a node 720 corresponding to the English representation "Cecilia", a node 722 corresponding to the English word "msn" (note that this word is not translated from a NEC word, as it appears on web page 600 in English form), a node 724 corresponding to the pinyin representation "zhu ye", and a node 726 corresponding to the English representation "home-page".

Figure 9:
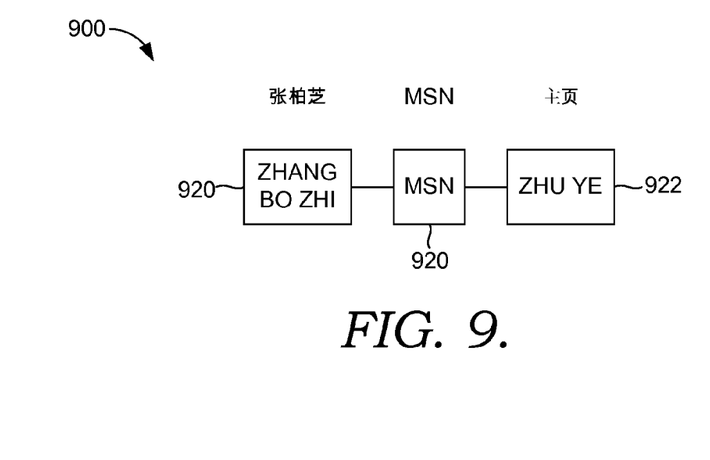
FIG. 9 depicts an illustrative pruned lattice in accordance with embodiments of the invention.

According to some embodiments, for the web page 600, the matching process of the lattice 710 generated by the first anchor phrase, "张柏芝 msn主页", and the URL substrings of web page 600 can be characterized as follows. First, the URL is split and the following URL substrings can be extracted: subdomain—"msn"; base domain—"ynet"; and path—"ent stars zhangbozhi". As previously described, to streamline the matching process, the lattice 710 can be pruned. For example, in embodiments, for an English word to remain in the lattice 710, the English word needs to have at least three characters that match. Thus, in some implementations, as the substring made of first three characters of "Cecillia" is "cec", which does not appear in the initial parts of any of the URL substrings, the corresponding node 720 is pruned from the lattice. The node 726 corresponding to the English representation "homepage" can also be pruned according to the same algorithm. Therefore, the lattice 710, after pruning, appears as depicted in FIG. 9. As shown in FIG. 9, the pruned lattice 900 includes three remaining nodes: node 920, "zhang bo zhi", node 922 "msn", and node 924, "zhu ye".

Then for each URL substring, an exemplary matching process will now be described. First, a URL substring, "msn", is selected. Only the second node in the pruned lattice 900 starts with "m", the first letter of "msn". Thus, the first path of length=1 to be matched is "msn". Of course, the URL substring "msn" exactly matches with path "msn". Accordingly, this path is added to a candidate path list (not illustrated for brevity and clarity) as the first candidate path. Next, a path of length=2 (i.e., "msn" "zhu ye") is defined. As the URL substring "msn" does not contain any initial substring of node "zhu ye", this path will not generate a candidate matching path. Because the end of the lattice is reached, no other path can be matched. So for the URL substring "msn", the matching process yields one candidate path: "msn". However, as "msn" is not a mapping from a Chinese name, it is not included in the final URL/Chinese word pair list.

With continued reference to FIG. 9, the next URL substring is "ynet". Because no node in the pruned lattice 900 starts with a "y", this URL string has no candidate matching path. The next URL substring is "ent" and there is no node in the lattice that starts with an "e." Accordingly, the URL substring has no candidate matching path with respect to the first anchor. Similarly, the URL substring "stars" has no candidate matching path because no node in the pruned lattice 900 starts with "s". However, the URL substring "zhangbozhi" does have a candidate matching path. The first node in the lattice starts with "z". Thus, the first path of length=1 to be matched is "zhang bo zhi". This path matches perfectly with the URL substring "zhangbozhi" and, therefore, the candidate path is added to the candidate path list.

Continuing with the exemplary matching process, a path of length=2 (i.e., "zhang bo zhi" "msn") is defined and matched against URL substring "zhangbozhi". As the URL substring "zhangbozhi" does not contain any initial substring of node "msn", this path fails to produce a candidate matching path. Therefore, the node "msn" will be added to the JumpNodeList. Next, a path of length=3 (i.e., "zhang bo zhi" "msn" "zhu ye") is defined. As the "msn" node is in the JumpNodeList, it is removed from the path. Thus, the path becomes "zhang bo zhi" "zhu ye". The URL string "zhangbozhi" does not contain any initial substring of node "zhu ye", and, therefore, this path fails to produce a candidate matching path, as well. Accordingly, for the URL substring "zhangbozhi", there is only one candidate path: "zhang bo zhi". The Chinese word corresponding to this candidate path is "张柏芝". Thus, the output of the matching process includes one URL/Chinese word pair: "zhangbozhi/张柏芝".

By utilizing embodiments of the exemplary matching process described above, for the URL http://msn.ynet.com/ent/stars/zhangbozhi/, one URL/Chinese word pair (i.e., "zhangbozhi/张柏芝") is obtained using the first anchor phrase, "张柏芝msn主页". Similarly, one pair ("stars/明星") is obtained using the third anchor phrase, "女明星 张柏芝"; and three pair ("zhangbozhi/张柏芝"), ("stars/明星"), ("ent/娱乐") are obtained using the title. Thus, all together, three distinct pairs ("zhangbozhi/张柏芝", "stars/明星", and "ent/娱乐") are obtained from the URL http://msn.ynet.com/ent/stars/zhangbozhi/ based on the above exemplary matching algorithm.

Figure 10:
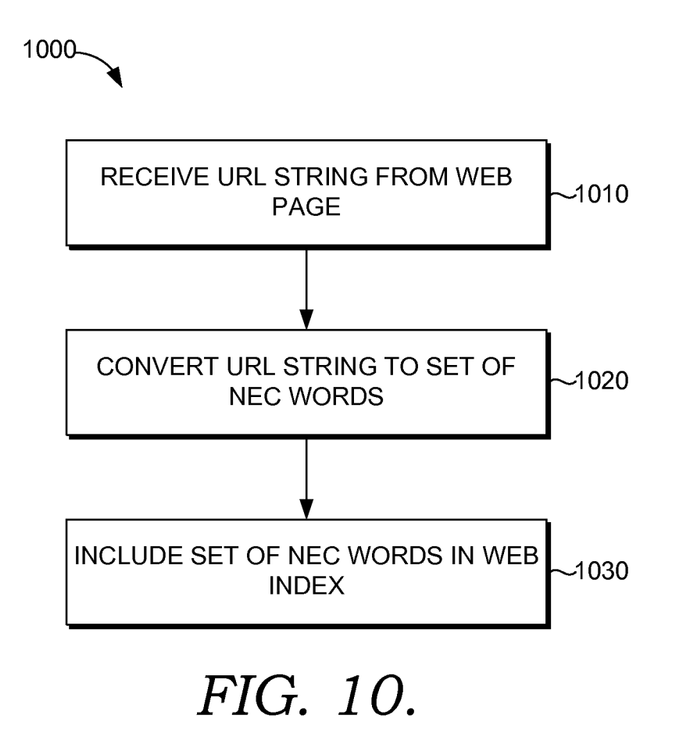
FIG. 10 is a flow chart illustrating an exemplary method of enhancing a web index with URL/NEC word pairs to facilitate relevance ranking of search results provided in response to a search query that includes NEC words in accordance with embodiments of the invention.

To recapitulate, the disclosure above has described systems, machines, media, methods, techniques, processes and options for enhancing a web index with URL/NEC word pairs to facilitate relevance ranking of search results provided in response to a search query that includes NEC words. Turning to FIG. 10, a flow diagram is illustrated that shows an exemplary method 1000 for enhancing a web index with URL/NEC word pairs according to embodiments of the present invention. In some embodiments, aspects of embodiments of the illustrative method 1000 can be stored on computer-readable media as computer-executable instructions, which are executed by a processor in a computing device, thereby causing the computing device to implement aspects of the method 1000. The same is, of course true, with the illustrative method depicted in FIG. 11, or any other embodiment of these methods. The computing device can be associated with, for example, a search service or the like.

At step 1010, a URL is received from a web page. The URL may include any number of characters, words, and/or phrases and can be represented by any suitable encoding language such as, for example, ASCII, UTF-8, UTF-16, and UTF-32. At step 1020, the URL is converted into a sequence of NEC words. In embodiments, the URL can be converted into several different candidate sequences of NEC words, each of which can be referenced in response to a user-submitted search query to facilitate ranking of search results provided in response to the query. At a final illustrative step, step 1030, the sequence of NEC words is included in a web index to facilitate relevance ranking of search results provided in response to a search query that includes NEC words. In some embodiments, the NEC words can be integrated into an existing web index and in other embodiments, the NEC words can be integrated into a web index at the time of generation of the index. In some embodiments, the NEC words can be associated, within the web index, with the URL. In other embodiments, the NEC words (and, generally, their association with the URL) can be maintained in an index, database, table, or the like, that is separate from, but associated with, a web index.

Figure 11:
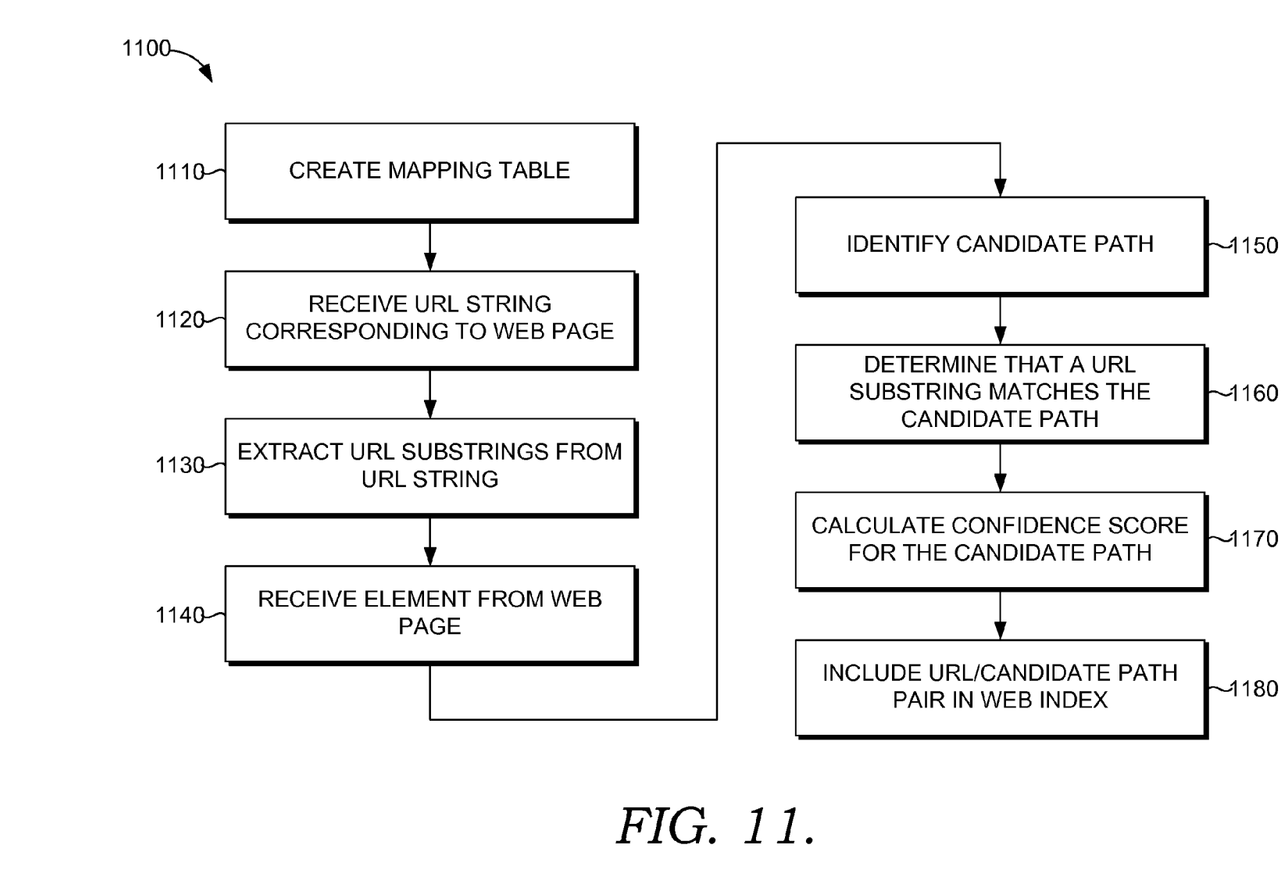
FIG. 11 is another flow chart illustrating an exemplary method of enhancing a web index with URL/NEC word pairs to facilitate relevance ranking of search results provided in response to a search query that includes NEC words in accordance with embodiments of the invention.

Turning now to FIG. 11, another illustrative method 1100 of enhancing a web index with URL/NEC word pairs according to embodiments of the present invention is illustrated as a flow diagram. Embodiments of the illustrative method 1100 include creating a mapping table, as illustrated at step 1110. In embodiments, the mapping table includes mappings between one or more NEC words and corresponding encoding characters such as, for example, pinyin, English, digital, and the like. In some embodiments, the mapping table can be generated as a table, a relational database, a matrix, or the like.

At step 1120, a URL string that corresponds to a web page is received. At step 1130, URL substrings are extracted from the URL. In embodiments, the URL substrings can include, for example, a sub-domain, a base domain, a path, and the like. At step 11140, an element is received from the web page. According to various embodiments of the invention, the element can include an HTML element, an object, text, an image, and the like. In one embodiment, for example, the element is a title of the web page. In another embodiment, for example, the element can be an anchor or a hierarchy string.

At step 1150, a candidate path is defined. In embodiments, the candidate path is defined by traversing a lattice corresponding to the element. For example, the element can be word-broken into a sequence of NEC words. All possible encoding-language representations of each NEC word can be obtained from a mapping table. Thus, the lattice can include a set of nodes, where each node corresponds to a potential candidate encoding-language representation of a NEC word.

At step 1160, the system determines that the URL substring matches the candidate path. In embodiments, any number of measures can be taken to introduce varying levels of efficiency and performance to the matching process such as, for example, pruning the lattice before defining candidate paths, omitting nodes that do not match particular portions of the URL substring, and the like. At step 1170, a confidence score associated with the candidate path is calculated. In embodiments, the confidence score can be calculated based on, for example, on path length, matched part length, skipped node number, and the like. At a final illustrative step, step 1180, the matching URL/candidate path pair is included in a web index, where it can be used for enhancing search-result relevance ranking in response to user-submitted search queries, for example.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more computer-readable hardware devices having embodied thereon computer-executable instructions that, when executed by a processor in a computing device associated with a search service, cause the computing device to perform a method of enhancing a web index with uniform resource locator (URL)/non-encoding character (NEC) word pairs to facilitate relevance ranking of search results provided in response to a search query that includes NEC words, the method comprising:

receiving a uniform resource locator (URL) corresponding to a web page, wherein the URL includes a first string of encoding characters;

transforming the first string of encoding characters into one or more NEC words, wherein said transforming includes inferring a translation based on content from the web page, the content including at least one element of the web page other than the URL, wherein transforming the first string of encoding characters into one or more NEC words includes representing said first string of encoding characters by one or more pairs of URL substrings and corresponding NEC words; and including the set of NEC words in a web index.

2. The media devices of claim 1, wherein said first string of encoding characters includes one or more English characters.

3. The media devices of claim 1, wherein said first string of encoding characters includes one or more pinyin representations of Chinese words.

4. The media devices of claim 1, wherein said representing includes:

referencing a plurality of elements from the web page, the plurality of elements including at least one selected from the following: a title of the web page, anchor text for the web page, and text from a body of the web page; and converting the URL string into a sequence of NEC words, wherein said converting is based, in part, on said plurality of elements.

5. The media devices of claim 4, wherein said representing further includes:

referencing a mapping table, the mapping table comprising a mapping between a plurality of NEC characters and corresponding encoding characters;

identifying, via the mapping table, a plurality of possible encoding-character representations of the element; and selecting one of the plurality of possible encoding-character representations of the element.

6. The media devices of claim 1, wherein said NEC words include Chinese words, Japanese words, or Korean words.

7. The media devices of claim 1, wherein including the set of NEC words in a web index includes incorporating the set of NEC words into the web index when generating the web index.

8. The media devices of claim 1, wherein including the set of NEC words in a web index includes incorporating the set of NEC words into an existing web index.

9. A method of enhancing a web index with uniform resource locator (URL)/non-encoding character (NEC) word pairs to facilitate relevance ranking of search results provided in response to a search query that includes NEC words, the method comprising:

receiving a uniform resource locator (URL) corresponding to a web page, wherein the URL includes a first string of encoding characters;

transforming, by a computing device, the first string of encoding characters into one or more NEC words, wherein said transforming includes inferring a translation based on content from the web page, the content including at least one element of the web page other than the URL, wherein transforming the first string of encoding characters into one or more NEC words includes representing said first string of encoding characters by one or more pairs of URL substrings and corresponding NEC words; and storing the set of NEC words in a web index.

10. The method of claim 9, wherein said representing includes:

referencing a plurality of elements from the web page, the plurality of elements including at least one selected from the following: a title of the web page, anchor text for the web page, and text from a body of the web page; and converting the URL string into a sequence of NEC words, wherein said converting is based, in part, on said plurality of elements.

11. The method of claim 9, wherein said NEC words include Chinese words, Japanese words, or Korean words.

12. The method of claim 11, wherein said representing further includes:

referencing a mapping table, the mapping table comprising a mapping between a plurality of NEC characters and corresponding encoding characters;

identifying, via the mapping table, a plurality of possible encoding-character representations of the element; and selecting one of the plurality of possible encoding-character representations of the element.

13. The method of claim 9, wherein storing the set of NEC words in a web index includes incorporating the set of NEC words into the web index when generating the web index.

14. The method of claim 9, wherein storing the set of NEC words in a web index includes incorporating the set of NEC words into an existing web index.

15. A computerized system comprising:

one or more processors; and one or more computer storage media storing instructions to cause the one or more processors to:

receive a uniform resource locator (URL) corresponding to a web page, wherein the URL includes a first string of encoding characters;

transform the first string of encoding characters into one or more NEC words, wherein said transforming includes inferring a translation based on content from the web page, the content including at least one element of the web page other than the URL, wherein transforming the first string of encoding characters into one or more NEC words includes representing said first string of encoding characters by one or more pairs of URL substrings and corresponding NEC words; and store the set of NEC words in a web index.

16. The computerized system of claim 15, wherein said representing includes:

referencing a plurality of elements from the web page, the plurality of elements including at least one selected from the following: a title of the web page, anchor text for the web page, and text from a body of the web page; and converting the URL string into a sequence of NEC words, wherein said converting is based, in part, on said plurality of elements.

17. The computerized system of claim 16, wherein said representing further includes:

referencing a mapping table, the mapping table comprising a mapping between a plurality of NEC characters and corresponding encoding characters;

identifying, via the mapping table, a plurality of possible encoding-character representations of the element; and selecting one of the plurality of possible encoding-character representations of the element.

18. The computerized system of claim 15, wherein said NEC words include Chinese words, Japanese words, or Korean words.

19. The computerized system of claim 15, wherein the set of NEC words are stored in the web index when generating the web index.

20. The computerized system of claim 15, wherein the set of NEC words are stored in an existing web index.

* * * * *